INVENTORS:
THOMAS W. MARTIN
ALBERT F. WARNER
BY
Harrington A. Lackey
ATTORNEY

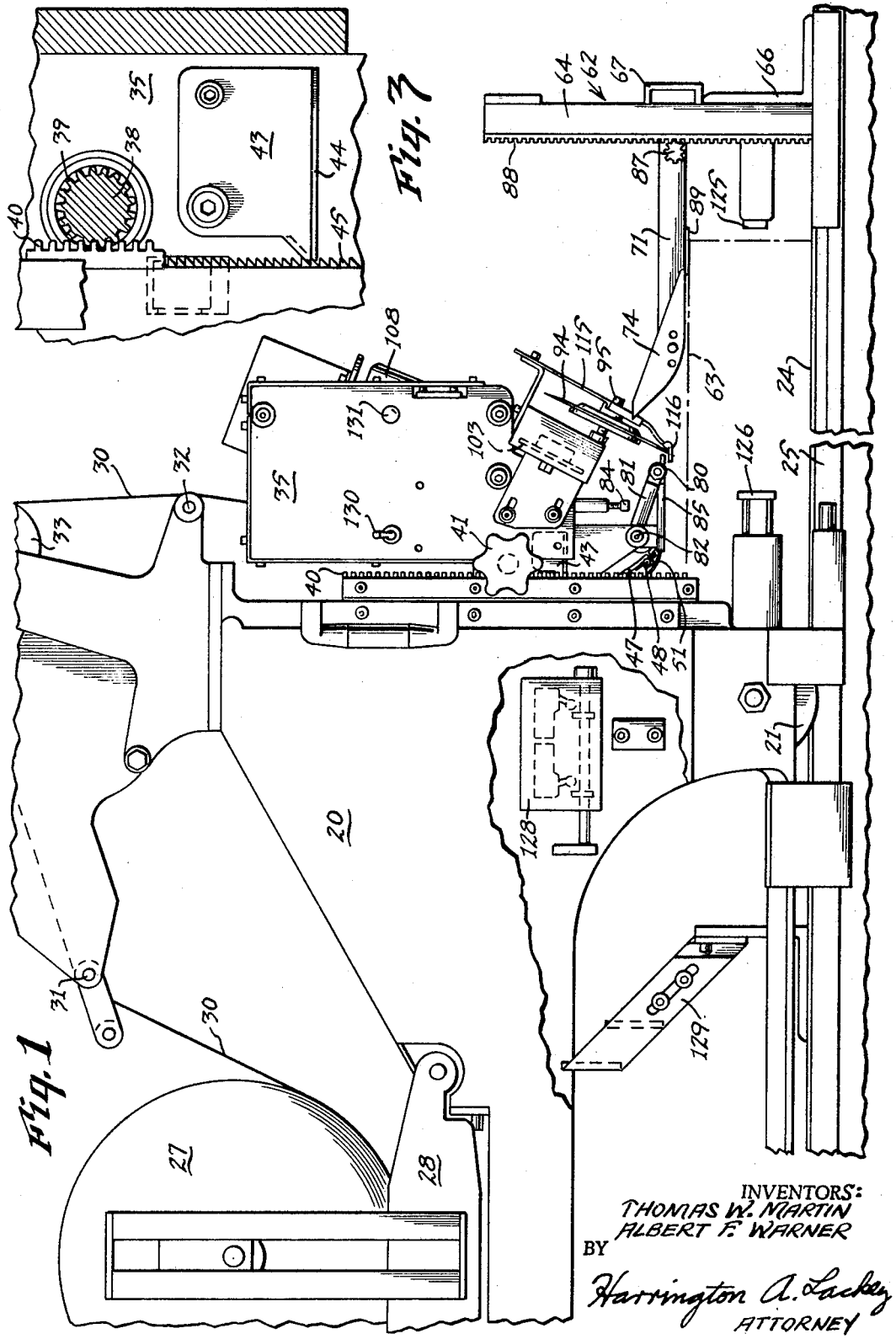

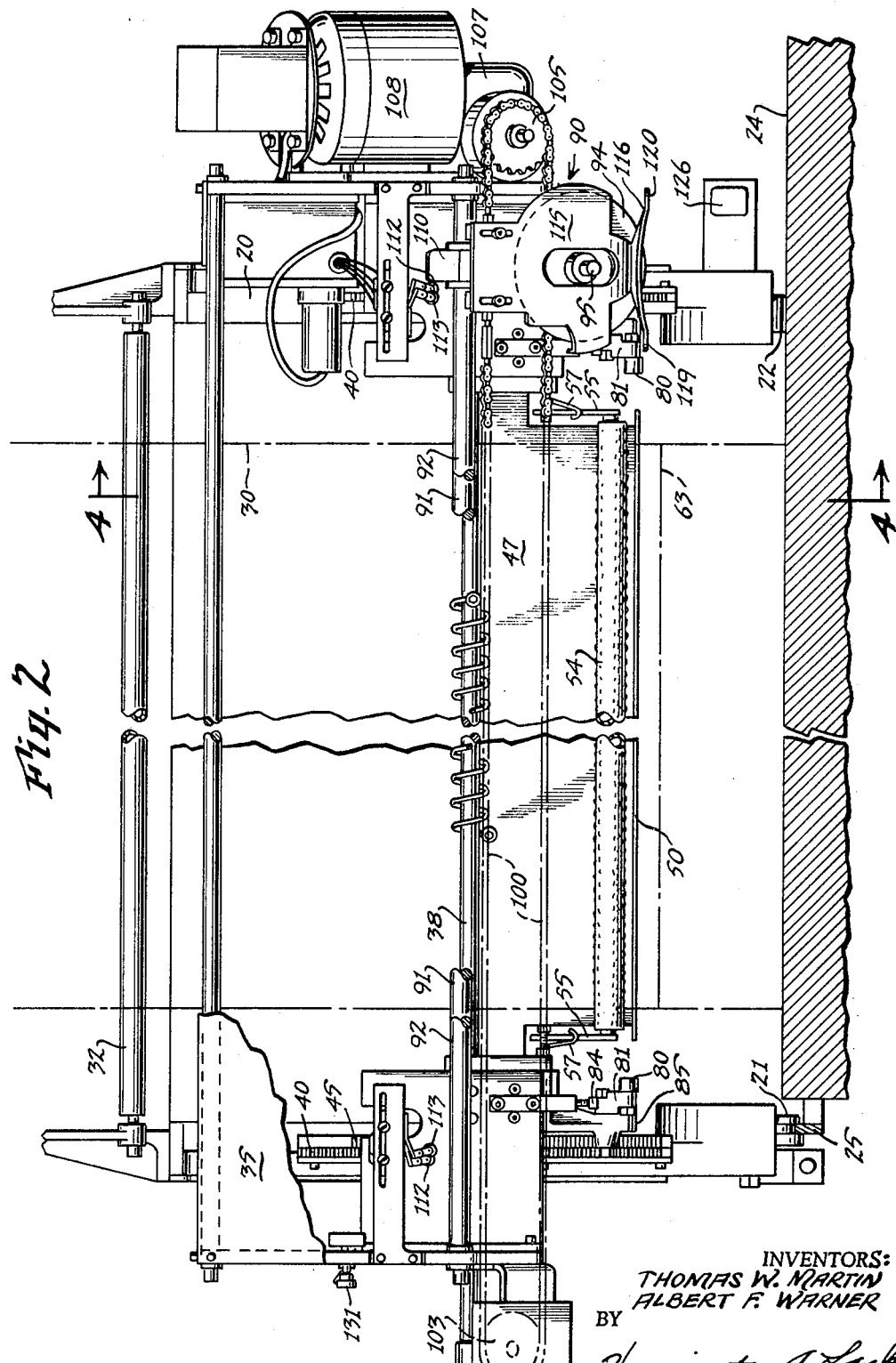

March 31, 1970     T. W. MARTIN ET AL     3,503,604
CUTTING APPARATUS FOR CLOTH SPREADING MACHINE
Filed July 24, 1967     5 Sheets-Sheet 4
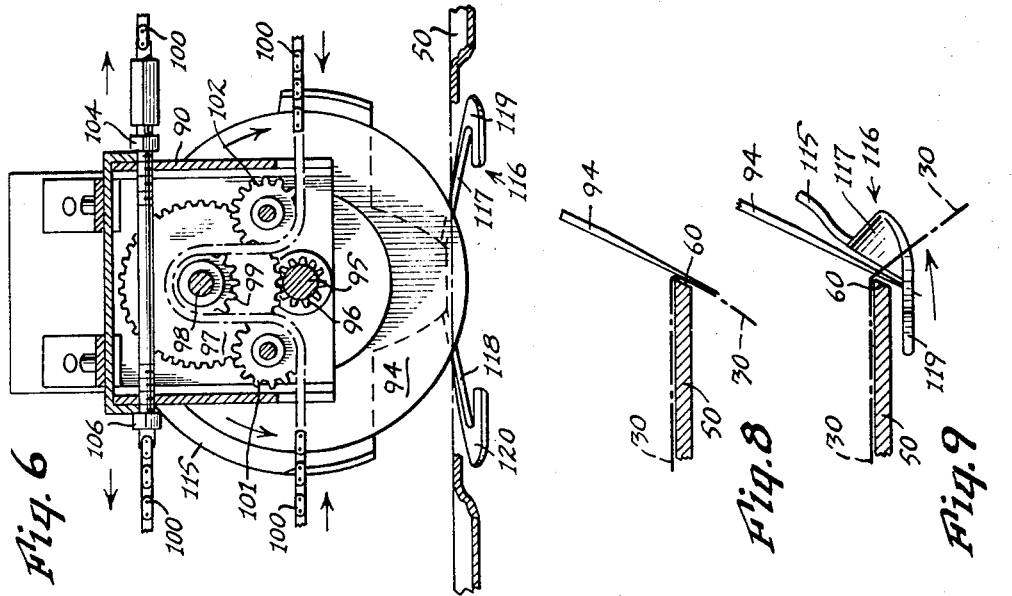
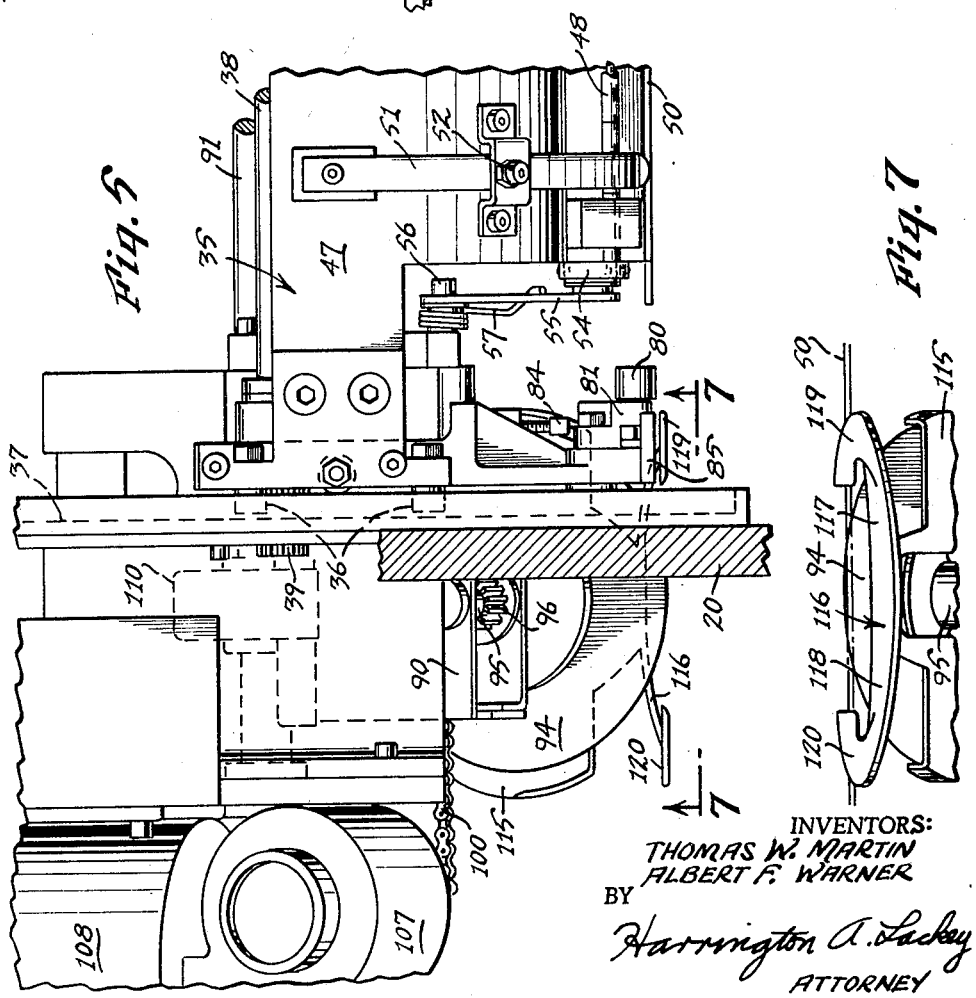
INVENTORS:
THOMAS W. MARTIN
ALBERT F. WARNER
BY
Harrington A. Lackey
ATTORNEY

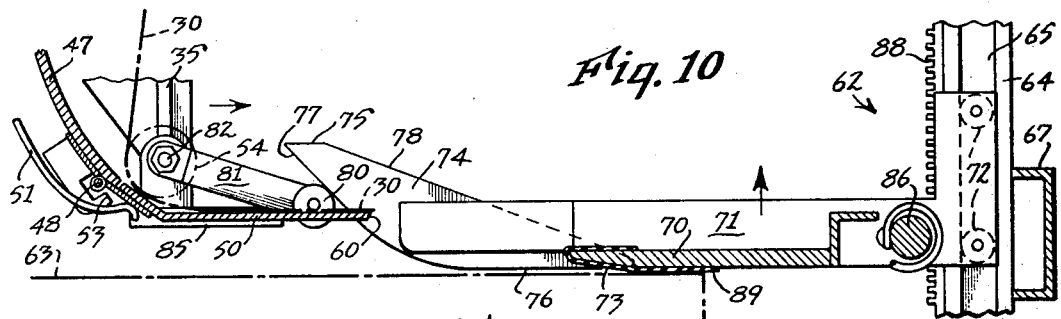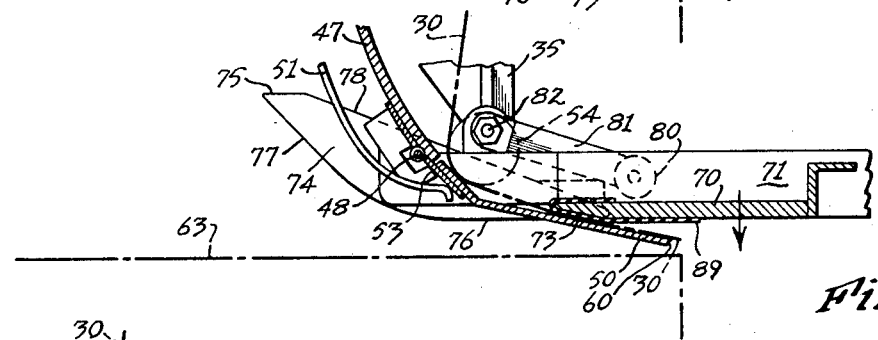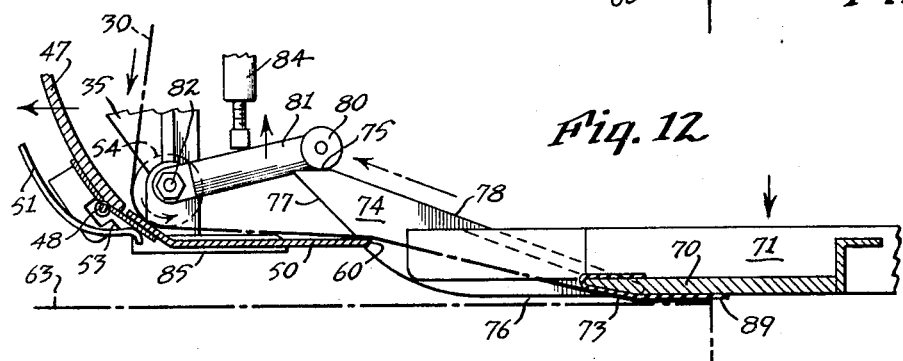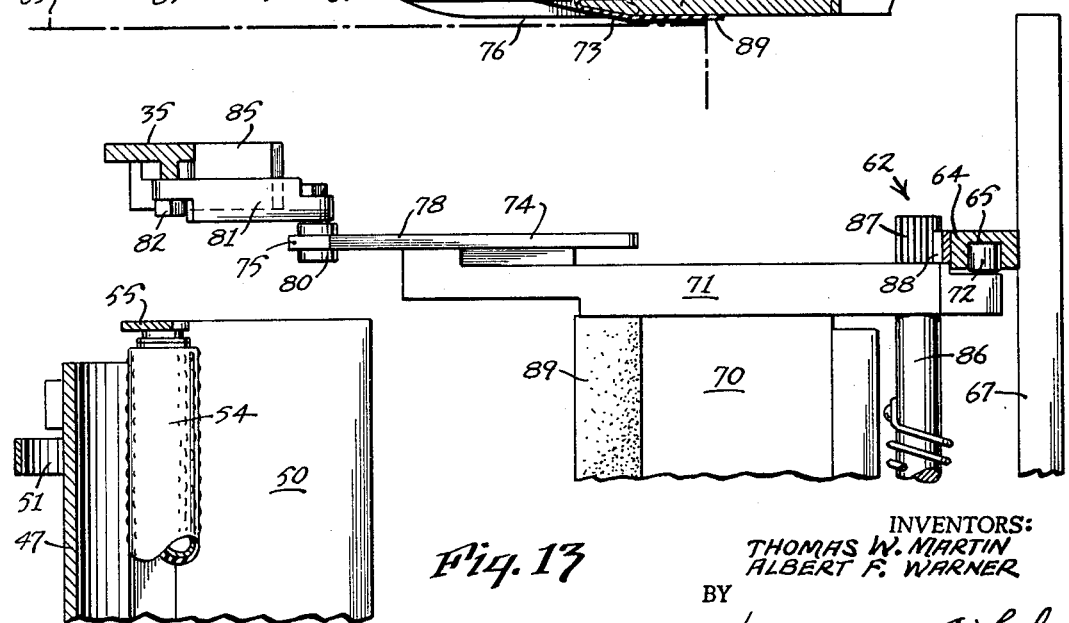

United States Patent Office

3,503,604
Patented Mar. 31, 1970

3,503,604
CUTTING APPARATUS FOR CLOTH SPREADING MACHINE
Thomas W. Martin and Albert F. Warner, Nashville, Tenn., assignors to Cutters Machine Company, Inc., Nashville, Tenn., a corporation of Tennessee
Filed July 24, 1967, Ser. No. 655,407
Int. Cl. B65h 29/46; B26d 1/18
U.S. Cl. 270—31                                    9 Claims

ABSTRACT OF THE DISCLOSURE

A transversely reciprocating cutter mounted on the mobile frame of a cloth spreading machine and cooperating with a spreader blade in order to cut the cloth after a layer of cloth has been spread. The spreader blade is also adapted to cooperate with a catcher mechanism for removing the cut end of the cloth from the spreader blade.

BACKGROUND OF THE INVENTION

This invention relates to a cloth spreading machine, and more particularly to a transversely reciprocable cutting apparatus for cutting the spread layers of cloth.

Transversely reciprocable cutting apparatus for cutting webs of material, such as cloth, are known in the art as exemplified in the Castricum Patent 1,730,560, and are known in combination with cloth spreading machines as exemplified in the Sayles Patents 2,670,040 and 2,727,571 and the Deichmann Patents 3,094,319 and 3,233,488.

However, in each of the Sayles and Deichmann patents, the rotary disc blade is mounted to travel in a horizontal plane, that is, the blade rotates about a vertical axis, to cut the vertically depending cloth. No means for controlling the end of the cloth after it is cut, much less any mechanism equivalent to a spreader blade, is disclosed in any of these references.

Moreover, none of the above references disclose a spreader blade especially adapted to cooperate with a reciprocable cutter mechanism for cutting the cloth and holding the cut end of the cloth, and adapted to cooperate with a catcher mechanism for smoothly removing the cut end of the cloth from the spreader blade.

SUMMARY OF THE INVENTION

This invention relates to the combination of a cutting apparatus with a cloth spreading machine which is adapted to overcome the above disadvantages of prior art cutting apparatus.

One object of the invention is to provide a cutting apparatus including a transversely reciprocable cutter adapted to cooperate with an especially constructed spreader blade for cutting the cloth discharged from the spreader blade, and for holding the cut portion of the cloth for subsequent delivery to a catcher mechanism.

Another object of this invention is to provide a cutting apparatus for a cloth spreading machine incorporating an especially constructed spreader blade which will cooperate with a transversely reciprocable cutting mechanism for cutting the cloth and will also cooperate with a catcher mechanism for removing the cut portion of the cloth from the spreader blade and for holding the cloth as the spreader blade spreads the subsequent cloth layer.

Another object of this invention is to provide in a cutting apparatus for a cloth spreading machine, a spreader blade having means for controlling the cloth as it is spread by the spreader blade and as it is cut by a cooperating cutting mechanism.

A further object of this invention is to provide a cutting apparatus for a cloth spreading machine comprising a rotary cutter blade cooperating with a spreader blade and further comprising a guide mechanism for maintaining the cloth supported by the spreader blade in cutting position.

Another object of this invention is to provide a cutting apparatus for a cloth spreading machine in which the cutting apparatus and its cooperating spreader blade are both mounted on the spreading machine for automatic vertical adjustment corresponding to the height of the spread layers of cloth.

BRIEF DESCRIPTION OF THE DRAWINGS

FIG. 1 is a fragmentary side elevation of the spreading machine incorporating this invention mounted on a table, with parts broken away to foreshorten the table and show the spreading machine proximate to its rear limit of travel and the catcher mechanism at the forward limit of travel;

FIG. 2 is a fragmentary front elevational view of the spreading machine disclosed in FIG. 1, with the table shown in section;

FIG. 3 is an enlarged fragmentary sectional elevation disclosing the vertically adjustable mounting mechanism for the spreader frame on the mobile frame;

FIG. 5 is a fragmentary sectional elevation taken along the line 5—5 of FIG. 4;

FIG. 6 is a fragmentary section taken along the line 6—6 of FIG. 4;

FIG. 7 is a bottom plan view of the rotary cutter mechanism taken along the line 7—7 of FIG. 5;

FIG. 8 is an enlarged sectional elevation disclosing a portion of the spreader blade and cutter blade without the cutter guide mechanism;

FIG. 9 is a view similar to FIG. 8, but including the cutter guide mechanism;

FIG. 10 is an enlarged sectional elevation disclosing the lower portion of the spreader frame approaching the catcher mechanism;

FIG. 11 is a sequential view similar to FIG. 10 disclosing the spreader blade cooperating with the catcher bar at the forward limit of travel to remove the cut end portion of the cloth from the spreader blade;

FIG. 12 is another sequential view similar to FIGS. 10 and 11 in which the catcher bar is holding the cut end portion of the fabric, and the spreader frame is moving away from the catcher mechanism; and FIG. 13 is a fragmentary plan section of the left end portion of the spreader frame and catcher mechanism disclosed in FIG. 10.

DESCRIPTION OF THE PREFERRED EMBODIMENT

Figure 4:
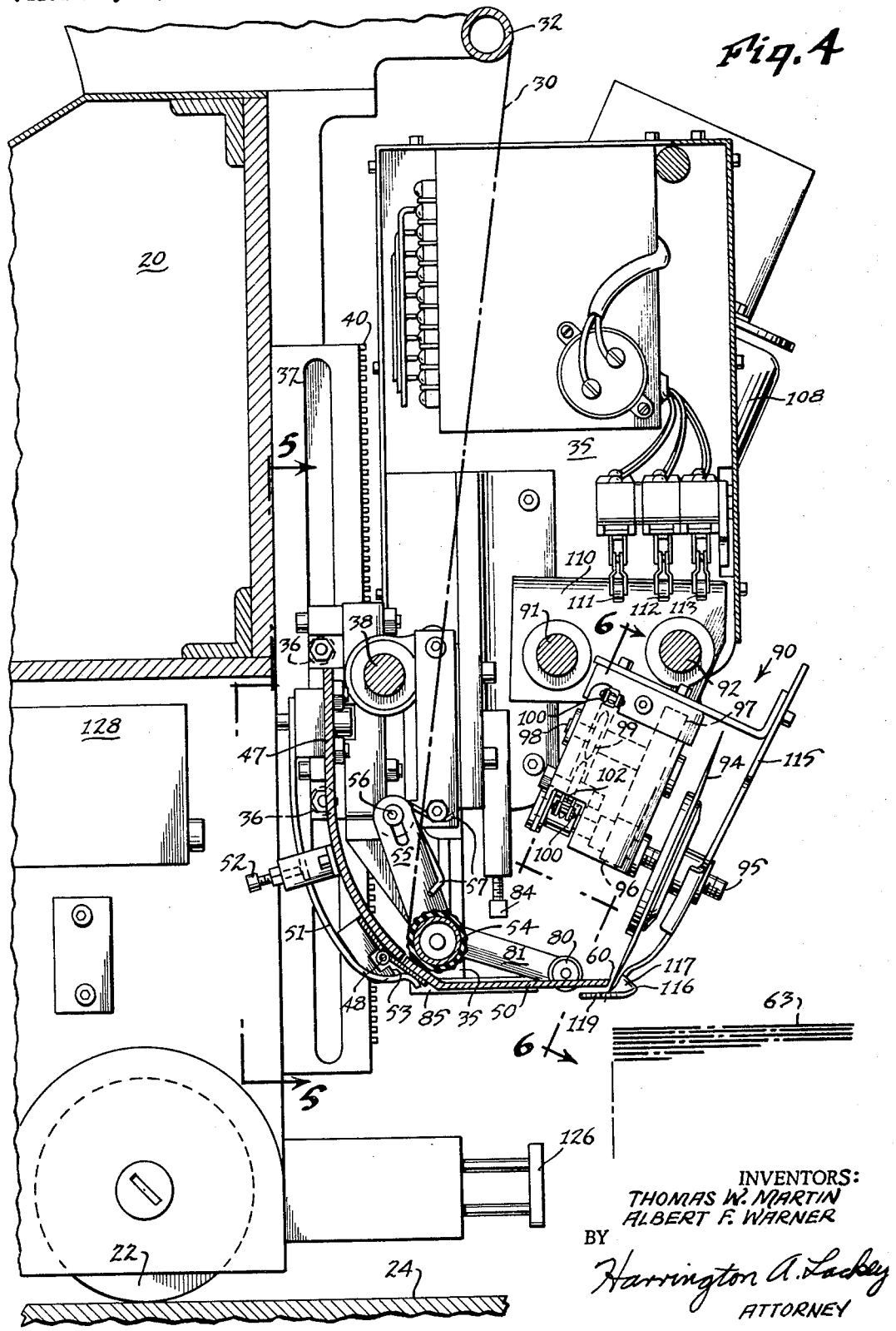
FIG. 4 is an enlarged sectional elevation taken along the line 4—4 of FIG. 2.

Referring now to the drawings in more detail, FIGS. 1 and 2 disclose a cloth spreading machine having a mobile frame 20 supported by right wheels 21 and left wheels 22 for longitudinal and reciprocable movement along a table 24. The right wheels 21 are grooved to ride on a track 25 supported on the right side of the table 24 in a conventional manner, while the left wheels 22 are adapted to rol on top of the table 24.

As disclosed in FIG. 1, a cloth supply roll 27 is mounted on a cloth roll carriage 28 on the mobile frame 20, and a web of cloth 30 is unwound and fed from the supply roll 27 over a plurality of guide rods 31 and 32 and top guide roller 33, as desired. The cloth roll 27 is preferably driven by means not shown to minimize tension in the web 30 as it is spread. The top roller 33 may be driven or not, as desired.

Mounted on the front end of the mobile frame 20 for vertical reciprocable movement is a spreader frame 35. The opposite ends of the spreader frame 35 are provided with guide rollers 36 constrained to rolling movement in vertically elongated slotted tracks 37 mounted on opposite sides of the front end of the mobile frame 20.

Rotatably supported in bearings in the spreader frame 35 is a transverse pinion shaft 38. The ends of the shaft 38 comprise pinions 39 engaging the racks 40 disposed on the front edges of the tracks 37. The right end of the pinion shaft 38 is also provided with a handle or knob 41 for manually rotating the pinion shaft so that the pinions 39 will move vertically along the racks 40 and thereby raise or lower the spreader frame 35 relative to the mobile frame 20.

In order to maintain the spreader frame 35 in any desired elevated position, a pair of pawls 43 and 44 are pivoted to the spreader frame 35 and adapted to alternately engage the vertical ratchet bar 45 fixed to the front end of the mobile frame 20, as best disclosed in FIG. 3.

Fixed to and extending transversely of the spreader frame 35 is a fabric guide wall 47, the upper end portion of which is disposed substantially vertically, while the lower portion is arcuate, gradually diverging toward the front of the machine. Pivotally mounted on the lower edge of the fabric wall 47 by an elongated piano-type hinge 48 is spreader blade or plate 50. The major and operative portion of the spreader blade 50 is disposed substantially horizontal in its normal operative position. The spreader blade 50 is maintained in this operative position by one or more strong leaf springs 51 fixed to the back of the fabric wall 47 and extending downwardly and bearing forwardly against the hinged portion of the spreader blade 50. The degree of bias of the spring 51 may be adjusted by means such as the adjustment screw 52. In order to limit the downward pivotal movement of the spreader plate 50 to a position spaced slightly above the top layer of spreader layers 63, a stop ledge 53 is fixed to the fabric wall 47 to extend below the spreader plate 50, as best disclosed in FIG. 11.

A transverse feed roller 54 having a highly frictional surface, such as knurled rubber, is supported at its opposite ends by the roller arms 55, the upper ends of which are pivoted about the pivot pins 56 fixed to the opposite end portions of the spreader frame 35. The roller arms 55 are biased downwardly by springs 57 to urge the feed roller 54 toward engagement with the spreader blade 50. The feed roller 54 is a unidirectional roller adapted to freely rotate in a counter-clockwise direction, as disclosed by the arrow in FIG. 12, but adapted not to rotate in the opposite direction. As best disclosed in FIGS. 4, 10, 11 and 12, the cloth or fabric web 30 is threaded from the guide bar 32 downwardly between the feed roller 54 and spreader blade 50, forwardly across the top surface of the spreader blade 50, and then over the transverse free edge 60 of the blade 50. With the feed roller 54 biasing the fabric 30 against the spreader blade 50, fabric 30 can move only forward across the top of the spreader plate 50, but cannot be pulled in the opposite direction.

Referring now to FIGS. 1 and 10–13, a cloth catcher mechanism 62 is mounted upon the table 24 at any desired position in front of the spreader frame 20 to determine the forward limit of travel of the frame 20 as well as the location of the front edges of the cloth layers 63. The catcher mechanism 62 comprises a pair of upright standards 64 provided with opposed vertical tracks 65. The standards 64 are fixed in transverse spaced relation by a transverse angle plate 66 and a transverse channel beam 67. The horizontal flange of the angle plate 66 may be fixed to the table 24 by any convenient means, not shown.

The catcher bar or plate 70 transversely spans the table 24 and is provided at opposite ends with the brackets 71 having roller bearings 72 for riding in the vertical tracks 65 of the standards 64. Mounted outward of each bracket 71 is a cam 74. The cam 74 has the configuration disclosed in FIGS. 1, 10, 11 and 12, with a substantially short, horizontal top edge or land 75, a substantially longer bottom surface 76, a forward or leading edge 77 sloping downwardly toward the standard 64 and connecting the top land 75 and the bottom surface 76. The reverse or back edge 78 of the cam 74 also slopes from the top land 75 downwardly and toward the catcher standard 64 to connect the bottom surface 76.

The cam 74 at each end of the catcher bar 70 is adapted to operatively engage a vertically aligned cam follower roller 80 supported by a follower arm 81 pivotally mounted to a portion of the spreader frame 35 by a pivot pin 82. Mounted upon the spreader frame 35 above and in the path of the follower arm 81 is a vertically adjustable stop screw 84. By adjustment of the stop screw 84, the upward movement of the follower arm 81 may be limited, for the purpose to be later described. The lower limit of movement of each cam follower 80 is determined by the follower ledges 85.

Rotatably supported by the opposed brackets 71 is a transverse pinion rod 86. The opposite ends of the pinion rod 86 outboard of the brackets 71 comprise pinions 87 engaging vertically disposed racks 88 mounted on the upright standards 64. The pinions 87 and racks 88 provide a mechanism for positively maintaining the catcher bar 70 horizontal as it reciprocates vertically along the standards 64.

The catcher mechanism 62 including the cams 74 and cam followers 80 are of substantially the same construction as the catcher mechanism disclosed in the co-pending application of Thomas W. Martin et al., S.N. 540,026, filed Apr. 4, 1966, for "Cloth Spreading Machine," resulting in U.S. Patent No. 3,400,927, issued Sept. 10, 1968.

The toe of the catcher bar 70 comprises a bottom surface 73 sloping upwardly away from the upright 64. The catcher bar toe is covered by highly frictional material 89, such as rubber, in order to provide a better grip by the catcher bar 70 upon the fabric 30.

The cutter mechanism incorporated in this invention includes a cutter head or carriage 90 slidably mounted for reciprocable movement along a pair of slide rods 91 and 92 having very low frictional surfaces and extending transversely of and fixed within the spreader frame 35. The cutter head 90 rotatably supports a cutter or disc blade 94 which is fixed on a cutter shaft 95. The cutter shaft 95 is rotatably supported within the cutter head 90 and supports a pinion 96 engaging a large gear 97 fixed on gear shaft 98. The gear shaft 98 also supports an intermediate sprocket 99 carrying chain 100 which is threaded around outer sprockets 101 and 103 rotatably supported within the cutter head 90. The right leg of the chain 100 extends around an idler sprocket 103, mounted on the right end of the spreader frame 35, and then returns to the cutter head 90 where it is fixed to the right side of the cutter head 90 by coupling 104.

The left leg of the chain 100 extends from sprocket 101 around driven sprocket 105 supported on the left side of the spreader frame 35, and then returns to the left side of the cutter head 90 to which it is attached by coupling 106. The driven sprocket 105 is driven through transmission 107 by electric motor 108 mounted on the left side of the spreader frame 35.

The cutter head 90 is tilted forwardly so that the cutter blade 94 will be disposed at an angle to the vertical. The lower portion of the blade 94 is spaced proximate to the free edge 60 and slants rearwardly beneath the spreader blade 50 to be in a better position to cut any fabric 30 which might hang down by virtue of any slack which might inadvertently develop in the spreading operation.

The slide rods 91 and 92 are parallel to the free edge 60 so that the blade 94 will make a transverse cut of the fabric uniformly spaced from the free edge 60, as best disclosed in FIGS. 4, 8 and 9.

A switch arm 110 is formed on top of the cutter head 90 to engage and actuate the three limit switches 111, 112 and 113 on opposite sides of the spreader frame 35. Since both sets of switches 111, 112 and 113 on the left and right sides of the machine have the same corresponding function, only the set of switches on the left side of the machine have been shown completely. Each set of three switches 111–113 are actuated simultaneously by switch arm 110. Switch 111 stops the cutter motor 108 and applies the cutter motor brake. Switch 112 actuates the motive means for moving the mobile frame 10 forward. Switch 113 reverses the drive of the cutter motor 108 for the next traverse of the cutter head 90 in the opposite direction.

Switch 130 is manually operated for selective automatic or manual operation of the cutter mechanism.

Push-button switch 131 is for manually starting the cutter motor 108.

Mounted on the front of the cutter head 90 and depending in front of the rotary cutter blade 94 is a guard plate 115. The bottom of the guard plate 115 terminates in a substantially C-shaped guide member 116 having transversely and oppositely extending arms 117 and 118. The arms 117 and 118 have smooth forward gradually curving edges which slope rearwardly toward their extremities beneath the spreader plate 50. The outer extremities of each arm 117 and 118 comprise toes 119 and 120 having blunt hooked ends respectively. As best disclosed in FIG. 9, each toe, such as the right toe 119 is disposed in normal operative position beneath the spreader blade 50 and behind the free edge 60. The hooked ends 119 and 120 function as protective guards about the edges of the cutter blade 94, and also provide an additional support beneath the spreader blade 50 should the springs 51 fail or undue cloth tension forces the spreader plate 50 down.

The sloping arms 117 and 118 extend across the path of the cutter blade 94 and will divert or sweep any fabric 30 depending from the free edge 60 forwardly into the path of the cutter blade 94 depending upon the direction of travel of the cutter blade 94 and therefore which arm 117 or 118 is the leading arm.

In order to limit the forward movement of the cloth spreader frame 20, a bumper or stop member 125 may be fixed to the catcher mechanism 62 for engaging the bumper 126 mounted on the front of the frame 20 and in longitudinal alignment with the stop member 125. If the frame 20 is self-propelled, then the bumper 126 may also be a switching mechanism for automatically reversing the direction of the frame 20 and for changing the speed of the frame 20 from low to high after the spreader plate 50 has disengaged the catcher mechanism 62.

Also, if the mobile frame 20 is self-propelled, another reversing switch 128 (FIG. 1) may be mounted on the mobile frame 20 to engage and be actuated by the actuator arm 129 fixed to the table 24 at the rear limit of travel. When switch 128 is actuated, the mobile frame is stopped, the mobile frame motive means is reversed, and the cutter motor 108 is simultaneously and automatically started.

In the operation of the cloth spreading machine as disclosed in the drawings, the frame 20 is designed to reciprocate longitudinally of the table 24 over a predetermined distance for spreading and cutting layers of cloth of a desired length. Only one catcher mechanism 62 is employed at the forward limit of travel for holding the cut ends of the layers of cloth 63. When the frame 20 reaches the rear limit of its travel, as disclosed in FIG. 4, the cloth is cut and the spread layer drops upon the top of the stack 63 so that all the read edges are vertically aligned. The frame 20 then "deadheads" forward, that is, moves forwardly without spreading any cloth and merely holds the cut fabric 30 upon the spreader blade 50 until the spreader blade 50 engages the catcher mechanism 62 for removing and holding the cut edge of the fabric. The purpose of this operation is to cut and spread each layer of cloth so that the same surfaces of the cut web 30 are always face down in the stack 63, while the opposite surfaces of the cut web 30 will always be face up.

Since the cloth spreader frame 20 is preferably self-propelled and its motor control system is designed for high speeds on its return or forward travel, it has been found that this method of spreading and cutting cloth is superior to that of the conventional turntable cloth spreading machines.

In consisting the operation of the invention in more detail, and assuming a starting position such as that disclosed in FIG. 11, where the catcher bar 70 is holding the cut end of the web 30, the frame 20 commences moving rearwardly in the direction of the arrow of FIG. 12 to spread a layer of cloth. When the frame 20 reaches the rear limit of its travel as disclosed in FIG. 4, switch 128 is actuated to stop the frame 20 and start the cutter motor 108 to drive the sprocket 105 and chain 100. As the chain 100 moves the cutter head 90 transversely of the table 24, it also rotates the sprockets 101, 99 and 102 to drive the rotary cutter blade 94 at a much faster rate than the speed of the chain 100 through the gears 97 and 96 of different sizes. When the fabric has been completely cut, the spread portion of the fabric drops upon the stack 63. The cutter head 90 remains on the side of the mobile frame 20 where its cut has been completed. The actuated switches 111–113 stop the cutter motor 108, reverse the motor 108 for the next cut and start the motive mechanism to move frame 20 forward over the spread layers 128 toward the catcher mechanism 62 without performing any spreading operation. The cut portion of the web 30 is held in position upon the spreader blade 50 by means of the unidirectional feed roller 54 with the cut edge of the web adjacent the free end 60 of the spreader blade 50.

As the frame 20 leaves the actuator arm 129, switch 128 may be designed to increase the speed of the frame from low-speed to high-speed, if desired.

As the mobile frame 20 approaches the catcher mechanism 62, as disclosed in FIGS. 1 and 10, the cam follower 80 engages the leading edge 77 of the cam 74. Since the downward pivotal movement of the follower arm 81 is limited by the stop ledge 85, then continued forward movement of the mobile frame 20 causes the cam follower 80 to elevate the cam 74 with the follower 80 riding forwardly along the leading cam surface 77 and the bottom surface 76. The cam 74 is simultaneously elevated carrying with it the catcher brackets 71 and the catcher bar 70, riding upwardly in the tracks 65 of the upright standards 64. When the mobile frame 20 has moved forwardly sufficiently for the cam follower 80 to pass completely beneath the bottom surface 76 to completely disengage cam 74, the catcher bar 70 drops, as disclosed in FIG. 11, upon the spreader blade 50. The weight of the falling catcher bar 70 causes the spreader blade 50 to pivot downwardly about its hinge 48 until the spreader blade 50 engages the stop ledge 53 to position the cut edge of the web 30 slightly above the top cloth layer on the spread stack 63. At this point, the bumper 126 has engaged the stop member 125 at the forward limit of travel of the mobile frame 20. The movement of the frame 20 is then reversed, either manually or by control means such as the reversing switch associated with the bumper 126. Since the coefficient of friction of the toe cover material 89 is much greater than the smooth surface of the spreader blade 50, the cut end of the web 30 is held by the sloping toe surface 73 of the catcher bar 70 as the mobile frame 20 moves away from the catcher mechanism 62, and the fabric is wiped from the spreader blade 50 and gently and smoothly laid on the top of the stack 63.

After the spreader blade 50 has completely moved away from beneath the catcher bar 70, the spring 51 biases the spreader blade 50 upwardly to its normally operative position as disclosed in FIG. 12. As the mobile frame 20 moves rearwardly, the cut end of the web 30 is held by the catcher bar 70 while the web is fed by the driven supply roll 27 across the spreader blade 50 causing the feed roller 54 to freely rotate in the direction of spreading and hold the web against the spreader plate 50 and against reverse movement.

As further illustrated in FIG 12, the catcher bar 70 and cam 74 gradually rise with the increasing height of the stack of cloth layers 63. If the increase in height is sufficient, the cam follower arm 81 will engage the stop screw 84 as the cam follower 80 rides across the top land 75 of the cam 74, to force the spreader frame 35 upward an increment of elevation. The spreader frame 35 is held at each successive elevation by one of the pawls 43 or 44 engaging a corresponding tooth 45 on the mobile frame 20. This elevational mechanism is also disclosed in the previously-mentioned, co-pending U.S. Patent No. 3,400,927 for "Cloth Spreading Machine."

As the mobile frame 20 continues moving rearwardly, the web 30 is spread on top of the stack 63, and when the frame 20 reaches the rear limit of travel it stops and the cutting operation is resumed by re-starting the cutter head 90 transversely in the opposite direction from its previous cutting direction, and the cycle is repeated.

What is claimed is:

1. A cutting apparatus for a cloth spreading machine comprising:
   (a) a mobile frame adapted to travel in a longitudinal and reciprocable path along a table for spreading cloth on said table,
   (b) a spreader blade, having a top surface and a free transverse edge,
   (c) means mounting said spreader blade transversely and substantially horizontally of said frame to direct said free edge toward one end of said path,
   (d) means on said frame for supporting and guiding a web of cloth to said spreader blade and across said top surface toward said free edge,
   (e) a catcher mechanism mounted adjacent said one end of said path and adapted to cooperate with said top surface of said spreader blade while said frame is proximate to said catcher mechanism, for removing and holding the end of portion of cloth carried by said spreader blade,
   (f) a cutter carriage supporting a cutter blade,
   (g) means mounting said carriage on said frame for transverse reciprocable movement above said spreader blade and for simultaneous actuation of said cutter blade,
   (h) said cutter blade being disposed proximately adjacent said free edge of said spreader blade for cutting said web along said free edge.

2. The invention according to claim 1 in which said catcher mechanism comprises a catcher bar disposed transversely of said path and mounted for free vertical reciprocable movement, cooperating means for introducing said spreader blade beneath said catcher bar as said frame approaches said catcher mechanism, said catcher bar being adapted to rest by gravity upon said top surface when said frame reaches said one end of its path to engage the web between said catcher bar and said top surface, hinge means mounting said spreader blade upon said mobile frame to pivot about a horizontal transverse axis, and spring means biasing said spreader blade upwardly to a normal, substantially horizontal spreading position, said spreader blade being adapted to yield and pivot downward under the weight of said catcher bar.

3. The invention according to claim 2 further comprising stop means on said frame adapted to engage and limit the downward pivotal movement of said spreader blade to a predetermined angle relative to said frame.

4. The invention according to claim 3 in which said catcher bar comprises a toe portion having a bottom surface sloping at said same predetermined angle for substantially flush engagement with said top surface of said spreader plate as said frame leaves said catcher mechanism.

5. The invention according to claim 1 in which the cutting plane of said cutter blade forms a dihedral angle with a vertical transverse plane, and said cutting plane extends from beneath said spreader plate upwardly by said free edge and away from said spreader plate.

6. The invention according to claim 1 in which said supporting and guiding means comprises a transverse, unidirectional feed roller, means mounting said roller transversely above said top surface of said spreader blade and spaced from said free edge, said feed roller being adapted to engage the web on said top surface to permit the web to move freely toward said free edge, but to stop movement of said web in the opposite direction.

7. The invention according to claim 1 in which said spreader blade mounting means comprises a spreader frame mounted for vertical reciprocable movement on said mobile frame, said spreader blade being attached to said spreader frame for movement therewith, said cutter carriage mounting means being supported on said spreader frame, and means for holding said spreader frame in various elevated positions.

8. The invention according to claim 1 further comprising a cutter guide member fixed to said cutter carriage, said member extending in advance of and across the cutting path of said cutter blade and beneath said spreader blade to guide cloth extending from said free edge of said spreader blade into said cutting path.

9. The invention according to claim 8 in which said guide member comprises an arm having an arcuate leading edge extending from a position laterally adjacent said cutter blade on the opposite side from said free edge across the path of said cutter blade to a position beneath said spreader blade.

References Cited

UNITED STATES PATENTS

| | | | |
|---|---|---|---|
| 2,670,040 | 2/1954 | Sayles | 83—484 |
| 2,727,571 | 12/1955 | Sayles | 83—484 |
| 3,400,927 | 9/1968 | Martin et al. | 270—31 |

FOREIGN PATENTS 1,055,873  1/1967  Great Britain.

LAWRENCE CHARLES, Primary Examiner

U.S. Cl. X.R.

83—484